US006980642B1

(12) United States Patent
Hung et al.

(10) Patent No.: US 6,980,642 B1
(45) Date of Patent: Dec. 27, 2005

(54) METHOD AND APPARATUS FOR ABBREVIATED DIALING IN A SUBSCRIBER TERMINAL

(75) Inventors: Yat-Sang Hung, Overland Park, KS (US); Barbara Ballard, Lecompton, KS (US); Tony Tsoi, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 625 days.

(21) Appl. No.: 09/702,486

(22) Filed: Oct. 31, 2000

(51) Int. Cl.[7] .......................... H04M 1/00; H04M 3/00

(52) U.S. Cl. .......................... 379/355.05; 379/355.02; 379/355.08; 379/355.09

(58) Field of Search ........................ 379/355.01–356.1, 379/216.01

(56) References Cited

U.S. PATENT DOCUMENTS 5,309,508 A 5/1994 Rosen ........................ 379/142
6,292,557 B1 * 9/2001 Gabara .................. 379/355.08
6,345,095 B1 * 2/2002 Yamartino ............. 379/355.08
6,360,108 B1 3/2002 Rogers

* cited by examiner

*Primary Examiner*—Curtis Kuntz
*Assistant Examiner*—Alexander Jamal

(57) ABSTRACT

A method and apparatus for providing abbreviated dialing functionality to a user's subscriber terminal or telephone by automatically adding a designated string of digits to any abbreviated extension dialed by the user. The subscriber terminal may include a processor, a memory (e.g., ROM, flash memory, non-volatile memory, hard disk, etc.), a "Send" button or the like, one or more sequences of digits stored in the memory, and a translation routine executable by the processor. The translation routine is executed when the processor determines that the digits entered by the user represent an abbreviated extension, for example, when a user dials fewer than seven digits and presses the "Send" button on a subscriber terminal. When executed, the translation routine automatically prepends or adds one of the stored sequences of digits to the abbreviated extension entered by the user, and then the subscriber terminal dials the resulting composite telephone number. Where multiple sequences of digits are stored in the memory, the user may have preselected which sequence to use, or, alternatively, the subscriber terminal may include logic to determine which sequence to use. For example, the subscriber terminal may use the length of the abbreviated extension as a basis to determine which sequence to use.

18 Claims, 6 Drawing Sheets

FIG. 4 (con't)
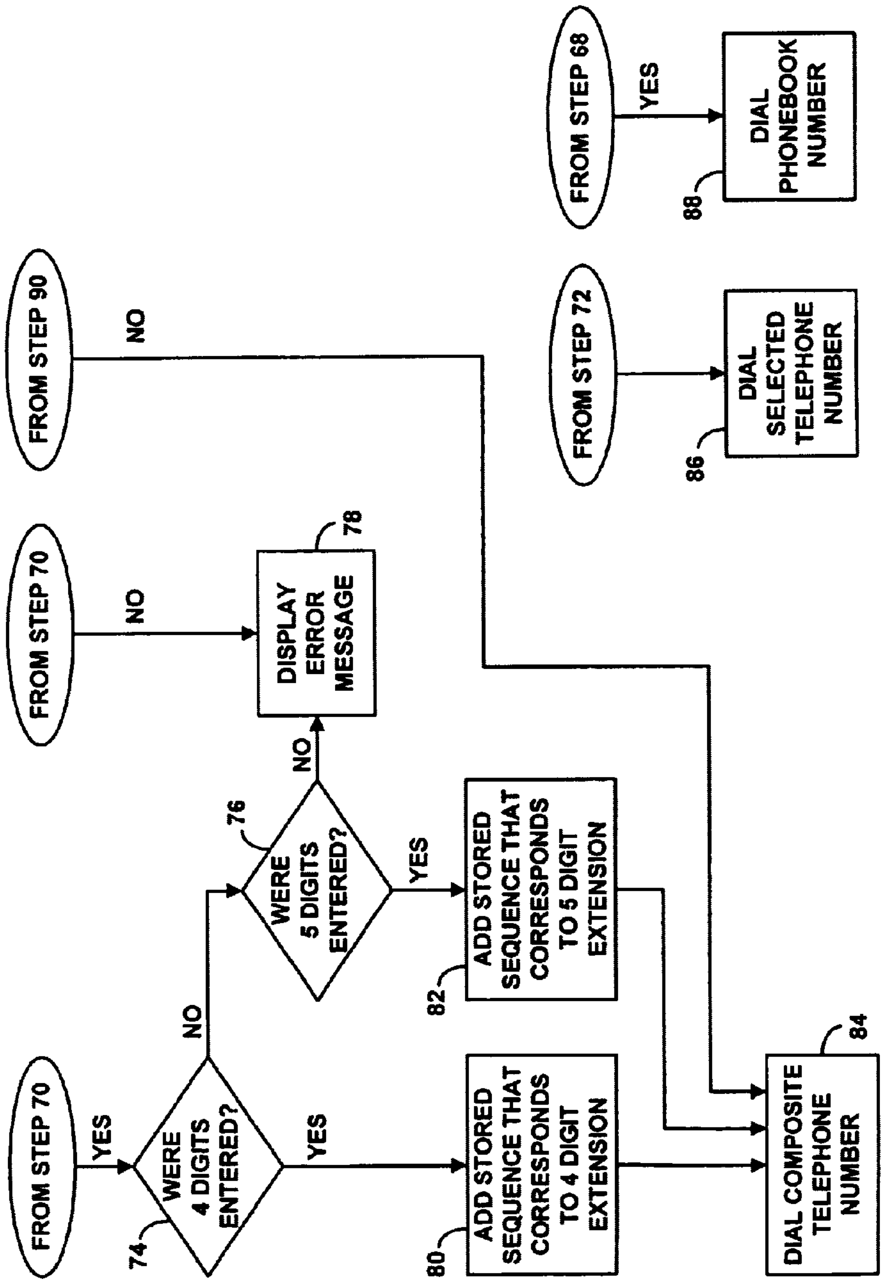

METHOD AND APPARATUS FOR ABBREVIATED DIALING IN A SUBSCRIBER TERMINAL

BACKGROUND OF THE INVENTION

1. Field of the Invention

The present invention relates to telecommunications services and, more particularly, to a method and apparatus for dialing calls.

2. Description of Related Art

Recent advances in telecommunications systems have enabled a wide array of special services to be made available to subscribers. One such service is abbreviated dialing, which allows a subscriber to reach a party by dialing less than the entire telephone number of that party. For many years now, private branch exchange (PBX) systems have provided users with an abbreviated dialing function, in which each PBX terminal is assigned an extension number, and a user at any terminal may place a call to any other terminal within the system by simply dialing the extension of that other terminal.

Typically, a public telephone company may assign to a PBX system a group of telephone numbers, all of which might have a common area code and prefix (e.g., NPA-NXX or NPA-NX, where N is any digit 2–9) and each of which may then have a distinct suffix or "extension" (e.g., XXXX or XXXXX, where X is any digit 0–9), which comprises the digits in the telephone number following the area code and prefix. The area code (NPA) may serve to designate a particular toll center or calling area, and the prefix (NXX or NX) may serve to designate a particular telephone company central office. (In recent years, with the growth of "local number portability," the direct relationship between prefix and central office has faded to some extent, yet the relationship still generally exists.)

Conveniently, the PBX may in turn assign each of the telephone numbers to a respective one of the terminals in the PBX system. Therefore, in order to call one of the terminals from a telephone outside of the PBX system, a person can dial the area code, prefix and extension of the terminal, and the call will be routed by the telephone company to the PBX and in turn to the terminal. Further, in order to call one of the terminals from another telephone within the PBX system, a person can simply dial the extension of the terminal, and the PBX will route the call to the terminal.

SUMMARY OF THE INVENTION

While PBX systems work well in practice to allow abbreviated dialing from within the PBX system to terminals within the system, they are inherently flawed in that they do not readily allow abbreviated dialing from telephones outside of the system to terminals within the system. A user at a telephone outside the PBX system must dial the area code and prefix (or at least the prefix) in order to allow the public telephone system to route the call to the appropriate PBX system, from which the call can then be routed to the called terminal.

One solution to this problem is to employ a network entity that converts dialed extensions into full length telephone numbers. An example of such an entity is a service control point (SCP), now commonplace in advanced intelligent networks (AINs). An SCP may maintain or access a database of subscriber profiles, which may define number translations per subscriber (user or terminal) or group of subscribers. The SCP may further maintain or access a set of logic designed to translate telephone numbers based on subscriber profiles.

In practice, when a subscriber dials a call at a telephone, a set of logic in a local telephone company switch may responsively send a query (a transaction capabilities application part (TCAP) query, for instance) to the SCP to determine how to handle the call. The query may identify the originating subscriber (e.g., the calling telephone number) and the dialed number (i.e., the called telephone number). The SCP may then retrieve a subscriber profile associated with the originating subscriber and employ its number translation logic to translate the called number to another number designated in the profile. The SCP may then send a response message to the switch, instructing the switch to set up and connect the call to the designated number.

With an SCP arrangement or the like, a subscriber profile can be set to indicate that any four digit number dialed by the subscriber should be treated as an abbreviated dialing extension. The subscriber profile may then indicate that a particular area code and prefix should be prepended to (added on to the beginning of) the abbreviated dialing extension, so as to produce a complete telephone number routable by the switch. The SCP may then send the complete telephone number in a response message to the switch, with instructions to route the call to the complete number.

This SCP arrangement can be advantageously extended to allow corporate groups of subscribers to benefit from PBX-like abbreviated dialing from outside the corporate PBX system. For instance, the SCP or other such entity can be programmed with subscriber profiles associated with all of the home and/or mobile telephone numbers of people who have PBX extensions at work. Each subscriber profile can indicate that the area code and prefix associated with the PBX system should be prepended to any four-digit extension dialed from any such telephone number, or to particular extensions dialed from any such telephone number. Alternatively, a group subscriber profile can provide for the necessary number translations, and the SCP can tie each individual home and/or mobile telephone number to that group profile.

Unfortunately, however, a network-based abbreviated dialing system requires maintenance of abbreviated dialing translations in subscriber profile databases. This, in turn, gives rise to administrative costs and other burdens. Therefore, a better solution is desired.

Another possible solution is to have a subscriber terminal (for example, a telephone or any other customer provided equipment (CPE), such as an answering machine or standalone device) itself maintain a database of telephone numbers (i.e., a phone book), and have the terminal convert between dialed extensions and the telephone numbers that match those extensions. For instance, a telephone may have a memory (e.g., ROM, flash memory, non-volatile memory, hard disk, etc.), and include in its memory a list of contact names with corresponding telephone numbers. The telephone may then be programmed to respond to any four-digit number dialed by a user, by searching through the list of telephone numbers for a number whose last four digits match those dialed by the user. If the telephone finds the match, the telephone may then automatically convert the dialed four-digit number into the full telephone number that is listed in the phone book, and the telephone may send the full telephone number to the local telephone company switch.

Unfortunately, however, this four-digit dialing solution also suffers from an inherent flaw. In particular, it requires the telephone to be loaded with a phone book that is complete enough to facilitate translation of many abbreviated extensions into corresponding numbers. The need to load many telephone numbers into a telephone can be burdensome for a user, and the existence of many phone book entries in a telephone can consume memory space and other valuable resources. Further, with this arrangement, if the telephone does not find a match in the phone book for a particular abbreviated extension, the telephone will not be able to translate the extension into a telephone number. Consequently, an even better solution is desired.

In a first principal aspect, an exemplary embodiment of the present invention may take the form of a method and apparatus that provides abbreviated dialing functionality to a user's subscriber terminal by automatically prepending a designated string of digits to any abbreviated extension dialed by the user. In this embodiment, the subscriber terminal may include a processor, a memory (e.g., ROM, flash memory, non-volatile memory, hard disk, etc.), a "Send" button or the like, one or more sequences of digits stored in the memory, and a translation routine executable by the processor. The translation routine is executed when the processor determines that the digits entered by the user represent an abbreviated extension, for example, when a user dials fewer than seven digits and presses the "Send" button on a subscriber terminal. When executed, the translation routine automatically prepends one of the stored sequences of digits to the abbreviated extension entered by the user, and then the subscriber terminal dials the resulting composite telephone number. In the case of multiple sequences of digits, the user may have preselected which sequence to use, or, alternatively, the subscriber terminal may include logic to determine which sequence to use. For example, the subscriber terminal may use the length of the abbreviated extension as a basis to determine which sequence to use.

By adding this automatic prepending functionality to a subscriber terminal, the subscriber terminal does not necessarily have to maintain a record of every possible composite telephone number, and the telephone company switch does not necessarily have to query an SCP or other network entity to translate an abbreviated extension into a full telephone number.

In a second principal aspect, an exemplary embodiment of the present invention may take the form of either a wireless subscriber terminal or a landline subscriber terminal having functionality such as that described above.

In a third principal aspect, an exemplary embodiment of the present invention may take the form of a subscriber terminal programmed with an "abbreviated dialing" setup routine. When a user invokes the setup routine, the subscriber terminal's processor prompts the user to enter a sequence of digits, which is then received by the terminal and subsequently stored in the memory. The sequence of digits thus stored becomes the sequence that is later automatically prepended to any abbreviated extension that may be dialed by the user, as described above.

Although an exemplary subscriber terminal does not need to employ a phone book, in an alternative exemplary embodiment, a subscriber terminal may additionally employ a phone book, resident in the memory. In this alternative embodiment, the subscriber terminal can be programmed to respond to an abbreviated extension as described above by first searching the phone book, to see if the abbreviated extension matches any of the entries in the phone book. If the abbreviated extension does not match any entry in the phone book, the subscriber terminal may automatically prepend the stored sequence of digits to the abbreviated extension and initiate a call to the resulting number as described above.

Alternatively, if the abbreviated extension matches one or more of the entries, then the subscriber terminal may be programmed to prompt the user to select from a set of possible numbers including (i) each matching number from the phone book and (ii) the composite number derived by prepending the designated string of digits to the dialed extension. The user may then readily select a desired number to dial, and the subscriber terminal may then initiate a call to the selected number.

In a fourth principal aspect, an exemplary embodiment of the present invention may take the form of a stand-alone subscriber terminal (e.g., adjunct box) that provides abbreviated dialing functionality to any telephone to which it is connected in series by automatically prepending a designated string of digits to any abbreviated extension dialed by a user. In this embodiment, the stand-alone subscriber terminal may include a processor, a memory, a sequence of digits stored in the memory, and a translation routine executable by the processor.

The translation routine is executed when the processor determines that the digits entered by the user represent an abbreviated extension, for example, when the user dials fewer than seven digits and presses a designated key on the telephone. Alternatively, the translation routine may be initiated by detecting that no further digits have been dialed within a predetermined period of time. When executed, the translation routine automatically prepends the stored sequence of digits to the abbreviated extension entered by the user, and then the subscriber terminal dials the resulting composite telephone number. Because the subscriber terminal in this embodiment is connected in series with the user's telephone, the subscriber terminal receives the digits dialed by the user before they are sent to the public switched telephone network (PSTN), allowing the stored sequence of digits to be prepended to the digits dialed.

By adding this automatic prepending functionality to a subscriber terminal, the subscriber terminal does not necessarily have to maintain a record of every possible composite telephone number, and the telephone company switch does not necessarily have to query an SCP or other network entity to translate an abbreviated extension into a full telephone number.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF AN EXEMPLARY EMBODIMENT

Figure 1:
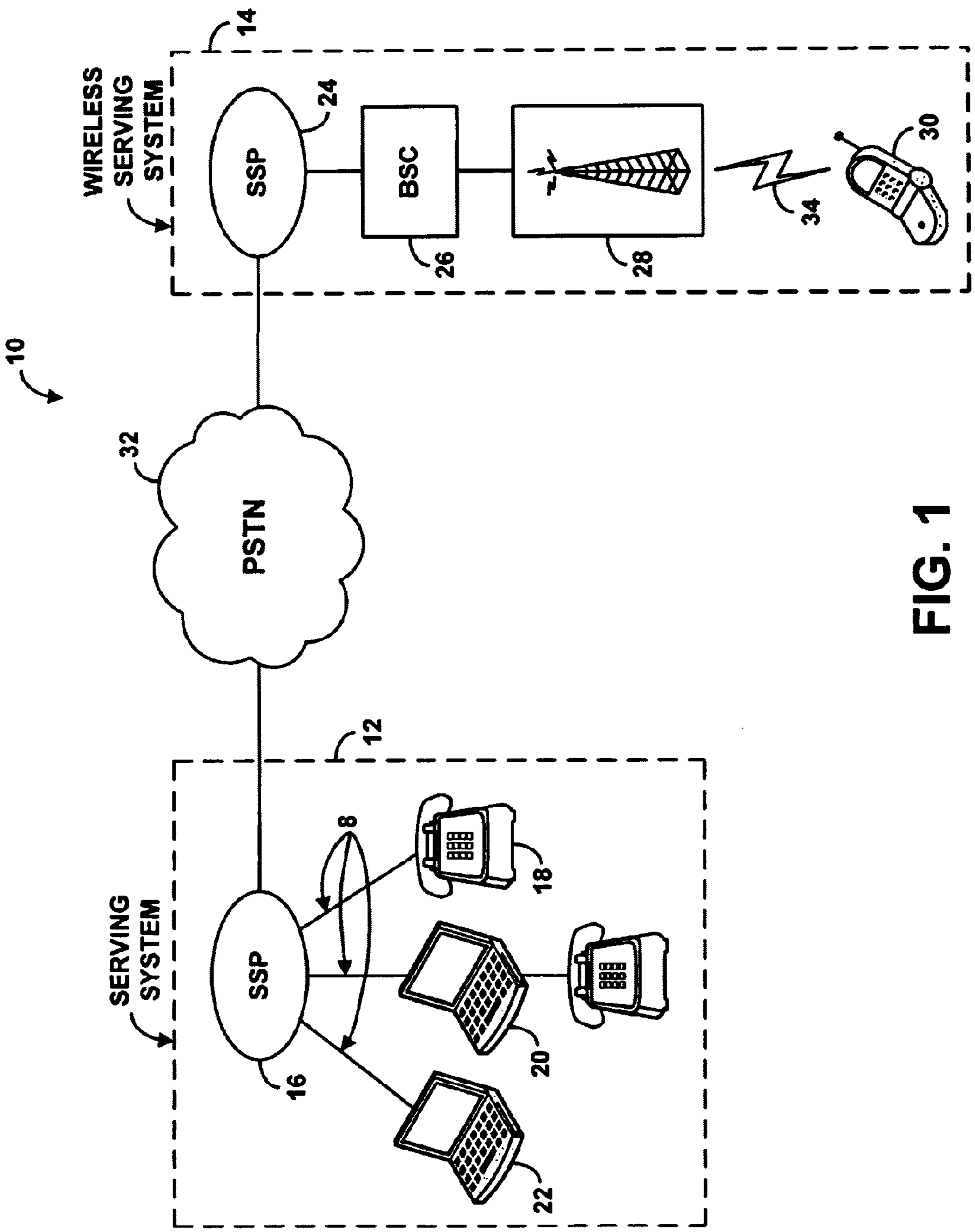
FIG. 1 is a simplified block diagram illustrating a telecommunications network in which an exemplary embodiment of the present invention can be implemented.

Referring to the drawings, FIG. 1 illustrates a simplified block diagram of a telecommunications network 10 in which an exemplary embodiment of the present invention may be employed. As shown in FIG. 1, network 10 includes a wireless serving system 14 and a landline serving system 12 interconnected to public switched telephone network (PSTN) 32. Landline serving system 12 is connected to PSTN 32 through service switching point (SSP) 16. Serving system 12 may further include multiple subscriber terminals, such as (without limitation) telephone 18, stand-alone subscriber terminal 20, and computer terminal 22, any or all of which may be connected to SSP 16 by the user's telephone line 8.

Wireless serving system 14 is connected to PSTN 32 through a mobile switching center (MSC) 24, such as a Telcordia MSC, a base station controller (BSC) 26, and a base transceiver station (BTS) 28. Serving system 14 may further include multiple subscriber terminals, of which exemplary subscriber terminal 30 is shown. Although subscriber terminal 30 is shown as a wireless telephone, it may take any suitable form, such as (without limitation) a computer or a personal digital assistant (PDA).

An object of the exemplary embodiment is to add abbreviated dialing functionality to a subscriber terminal. This functionality allows a user to dial an abbreviated set of digits that corresponds to another set of digits. A subscriber terminal of the present invention may be programmed to automatically modify the set of digits dialed by the user and then to send the modified set of digits to a network. For example, the subscriber terminal may automatically prepend a stored set of digits to an abbreviated set of digits dialed by a user, such as a PBX extension, and then send the resulting composite telephone number to a switch or other element of a telephone network.

Figure 2:
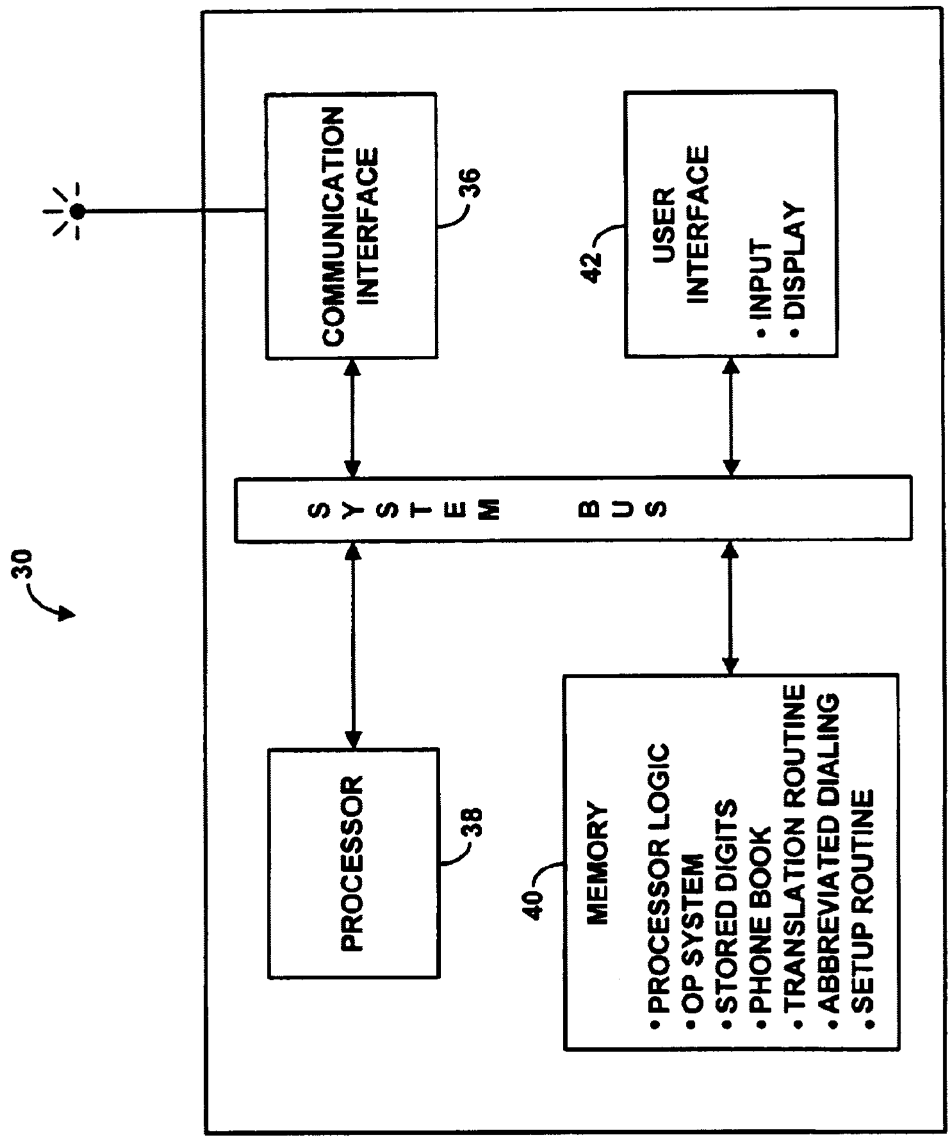
FIG. 2 is a simplified block diagram illustrating a subscriber terminal in which an exemplary embodiment of the present invention can be implemented.

By adding this automatic prepending functionality to a subscriber terminal, some of the disadvantages of adding abbreviated dialing functionality by other means (for example, through a network-based abbreviated dialing system or a subscriber terminal look-up routine) can be avoided. For purposes of illustration, this description will focus on the operation of the abbreviated dialing functionality in subscriber terminal 30. An exemplary embodiment of subscriber terminal 30 is shown in FIG. 2. Subscriber terminal 30, by way of example, may include a processor 38 (e.g., an integrated circuit microprocessor), a memory 40 (e.g., ROM, flash memory, non-volatile memory, hard disk, etc.), a user interface 34, and a communication interface 36, all of which may be interconnected by a system bus. This particular configuration is not crucial to the functioning of the present invention. For example, the present invention could be implemented by a device without a system bus and having a memory and processor contained in one integrated circuit. Further, those skilled in the art will appreciate that many of the elements described in this exemplary embodiment are functional entities that may be implemented as discrete components or in conjunction with other components, in any suitable combination and location.

Memory 40 may include more than one physical element, and may also include: an operating system for processor 38; one or more sequences of digits; a set of stored logic by which processor 38 may automatically prepend one of the stored sequences of digits to a set of digits entered by a user; a set of stored logic by which processor 38 may prompt a user to enter one or more sequences of digits to be stored in memory 40; and a phone book—i.e., a list of frequently dialed telephone numbers. Provided with the present disclosure, those skilled in the art can readily prepare appropriate computer instructions to perform such functions.

User interface 34 may include an input keypad and a display. The keypad may be used to enter digits such as 0–9 as well as non-numeric digits, e.g., letters a–z, symbols such as * and #, etc. The display may be used to prompt a user to enter a sequence of digits to be stored in memory 40, to display a set of digits entered by the user, to prompt the user to select a number to be dialed, etc. The keypad may then be used to enter a user's response to a prompt on the display, (for example, a prompt to initiate a call), to select one of various choices displayed to the user, or to initiate a call by pressing a send button or the like. It should be noted that a keypad and display are not crucial to the functioning of the present invention, and that any technology may be used to implement user interface 34. For example, a voice recognition/prompting interface could take the place of a keypad and display.

Communication interface 36 is a conventional wireless interface that is coupled via an air interface 34 (e.g., a $U_m$ interface as defined by IS-95) to BTS 28.

EXEMPLARY OPERATION

Figure 3:
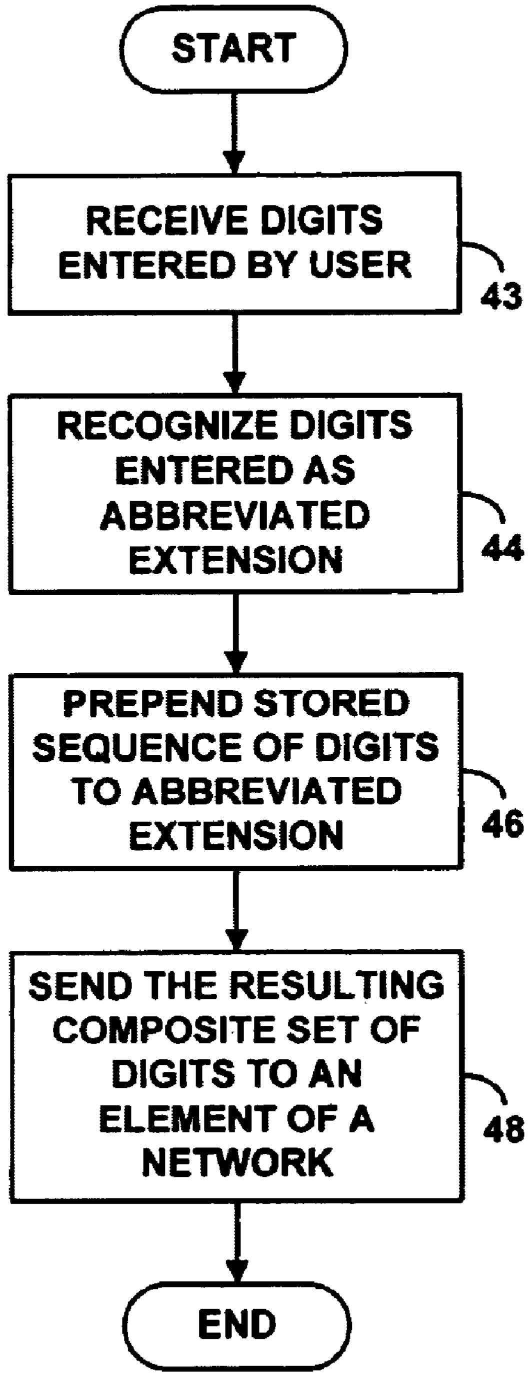
FIG. 3 is a flow chart illustrating the operation of an exemplary embodiment the present invention.

FIG. 3 illustrates a set of functions that may be involved in an exemplary embodiment of the present invention where subscriber terminal 30 allows a user to enter an abbreviated telephone number that corresponds to a full telephone number. The exemplary subscriber terminal may then complete the call by automatically adding the digits needed to those entered by the user to make a full telephone number. For example, the invention can allow the user to complete a telephone call when the user enters 4 or 5 digits rather than an area code, a prefix, and a telephone extension number.

First, in step 43, the user enters the 4 or 5 digit abbreviated number that he or she wishes to dial on the input of user interface 42. This abbreviated number may be a PBX extension, or the last 4 or 5 digits of a number having an area code and prefix that the user frequently dials, etc. Next, in step 44, the user initiates the call by pressing the "Send" button or the like on the keypad of user interface 42, which causes processor 38 to recognize that the user has dialed an abbreviated extension. It should be noted that a physical "Send" button is not crucial to the functioning of the invention—a call may be initiated by, for example, pressing a key that represents a Send button, "Call" button, etc., based on a prompt on the display of user interface 42. Alternatively, a call may be initiated when processor 38 recognizes a user's voice prompt or even a time delay, where processor 38 responds to a user's entry of an abbreviated extension because no additional digits have been entered after a certain time has passed.

As shown in step 46, processor 38 executes a routine to automatically prepend a stored sequence of digits to the recognized abbreviated extension dialed by the user. Next, in step 48, processor 38 sends the resulting composite set of digits to a switch or other element of a network, such as a telecommunications network.

Figure 4:
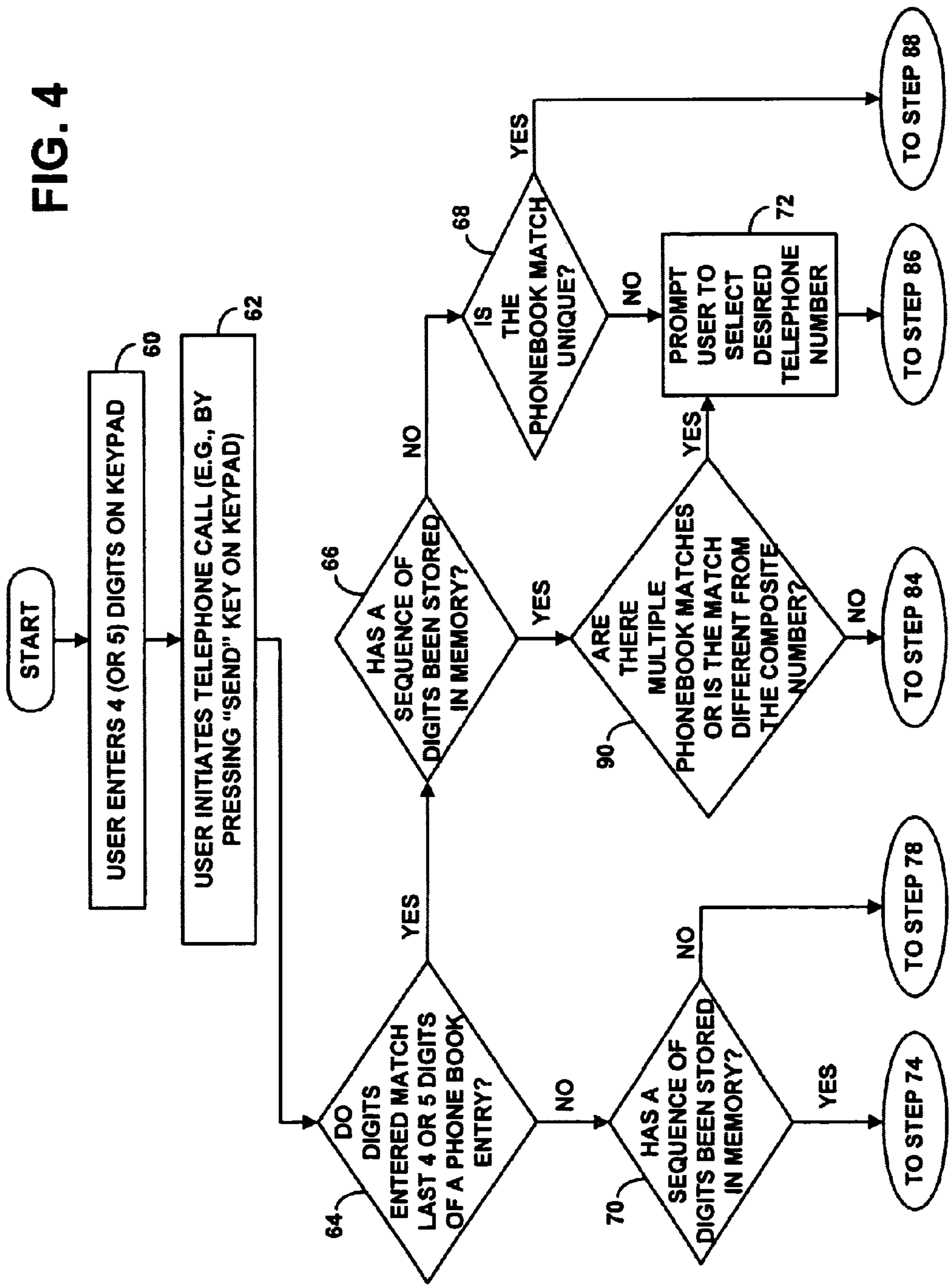
FIG. 4 is a flow chart further illustrating the operation of an exemplary embodiment of the present invention.

FIG. 4 illustrates a more detailed set of functions that may be involved in an exemplary embodiment of the present invention, which includes, in addition to the automatic prepending steps described above, a phone book lookup routine and a prompting routine to prompt a user to select the number to be dialed if the abbreviated extension entered by the user could correspond to more than one full telephone number.

First, in step 60, a user enters a 4 or 5 digit abbreviated extension on the keypad of user interface 42. Next, in step 62, the user initiates a call by pressing the "send" button or its equivalent on the keypad of user interface 42. Alternatively, subscriber terminal 30 may initiate a call after an extended pause. In step 64, processor 38 executes a phone book lookup routine that compares the digits entered by the user to the last 4 or 5 digits of the numbers stored in the phone book. If no match is found, the processor will determine, per step 70, if a sequence or sequences of digits that corresponds to either a 4 or 5 digit extension, or both, has been stored in memory 40. If no match is found and no sequence of digits has been stored in memory 40, the processor will cause the display to display an error message, step 78.

If a sequence of digits is stored in memory 40, the processor will determine if the user entered 4 digits, per step 74. If the user entered 4 digits, the processor will automatically prepend the stored sequence of digits that corresponds to a 4 digit extension, step 80, and then send the composite telephone number into a telecommunications network, step 84. If, on the other hand, the user entered 5 digits, as determined in step 76, the processor will automatically prepend the stored sequence of digits that corresponds to a 5 digit extension, step 82, and then send the composite telephone number into a telecommunications network, step 84. If the user dialed less than a full extension but not 4 or 5 digits, the processor would cause an error message to be displayed to the user, per step 78.

As an example of this, suppose that a user frequently dials into a PBX or similar system having the form of 234-567-XXXX, where 234 is an area code, 567 is a prefix, and XXXX is an extension. Suppose that the user also frequently dials telephone numbers with an area code and prefix of 345-67. If the user enters 4 digits, such as 4321, the subscriber terminal of the present invention will automatically prepend 1-234-567 to the digits entered and then send the resulting composite telephone number (1-234-567-4321) into a switch or other element of the PSTN 32. If the user instead enters the last 5 digits of a telephone number, such as 87654, and the subscriber terminal has a sequence of digits corresponding to a 5 digit abbreviated extension stored in memory 40, the subscriber terminal will automatically prepend 1-345-67 to the digits entered and then send the resulting composite telephone number ("1-345-678-7654") into a switch or other element of the PSTN 32. The subscriber terminal may, of course, be programmed to prepend just the appropriate 2 or 3 digit prefix if the user is calling from within his or her own area code. Other examples are possible as well.

If a match with a number in the phone book is found in step 64, processor 38 will determine, per step 66, if a sequence of digits has been stored in memory 40. If no sequence has been stored, the processor 38 will next determine if the digits entered by the user match the last 4 or 5 digits in more than one number stored in the phone book, as shown in step 68. If the match is unique, the subscriber terminal will send the full matched telephone number into a telecommunications network as shown in step 88. For example, suppose the user entered abbreviated extension "1234" and no sequence of digits to be automatically prepended was stored in memory 40, but a match was found with "1-219-233-1234" stored in the subscriber terminal's phone book, with no other matches found. The subscriber terminal 30 would send "1-219-233-1234" into a switch or other element of the PSTN 32.

If more than one match is found, processor 38 will execute a prompting routine to prompt the user, via the display of user interface 42, to select the desired telephone number from the group of possible numbers stored in the phone book, per step 72, and then the subscriber terminal will send the selected telephone number into a telecommunications network per step 86.

If a sequence of digits has been stored in memory as determined by processor 38 in step 66, the processor will next determine if there is more than one phone book number that matches the entered number. Processor 38 will also determine if a single phone book match is the same as the composite number that would result from prepending the stored sequence of digits to the entered number, as shown in step 90. If there is only one phone book number match and it is the same as the composite telephone number (in other words, if there is only one possible number the user could intend to dial), the subscriber terminal will send the composite/matched telephone number into a telecommunications network per step 84.

If, as shown in step 90, the digits entered match the last 4 or 5 digits of more than one number stored in the phone book or the single phone book number matched is not the same as the composite number that would result from prepending the stored sequence of digits to the entered number, processor 38 will execute a prompting routine to present a prompt to the user, via the display of user interface 42, to select the desired telephone number from the group of possible numbers, per step 72, and then the selected number will be sent into a telecommunications network, per step 86.

Figure 5:
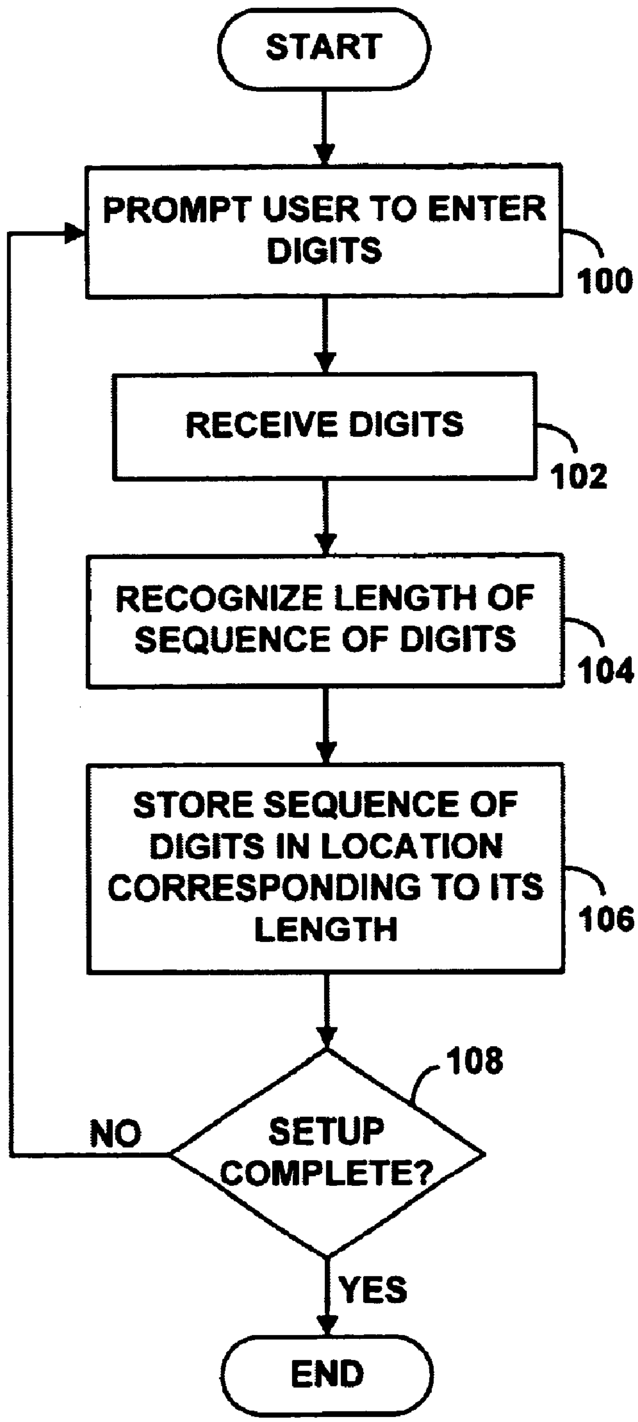
FIG. 5 is a flow chart illustrating an exemplary embodiment of an abbreviated dialing setup routine that may be used with the present invention.

FIG. 5 illustrates a set of functions by which an exemplary embodiment of the present invention may allow a user to specify a set or sets of digits to be stored in memory 40 of subscriber terminal 30. The sequence of digits to be stored may, for instance, represent an area code (if required) and a first 2 or 3 digits the user would normally dial to directly call someone within the user's PBX system Alternatively, the sequence of stored digits may represent an area code (if required) and/or a first 2 or 3 digits of a group of numbers that the user frequently dials, as described above.

As shown in step 100, the processor 38 causes a message to be displayed on the display of user interface 42 prompting the user to enter the desired sequence of digits on the keypad of user interface 42. The sequence of digits is then received by processor 38 as shown in step 102. Next, in step 104, the processor 38 recognizes the length of the sequence of digits entered and then, per step 106, stores the sequence in a location in memory 40 that corresponds to the length of the sequence.

For example, if the user enters a 3 or 7 digit sequence, the sequence will be stored in a memory location that corresponds to a 4 digit abbreviated extension, depending on whether or not an area code is necessary. If, on the other hand, the user enters a 2 or 6 digit sequence, the sequence will be stored in a memory location that corresponds to a 5 digit abbreviated extension, again depending on whether or not an area code is necessary.

Next, in step 108, processor 38 may cause the display to ask the user if the user wishes to enter another sequence of digits or to exit the setup routine. If the user responds negatively (e.g., by pressing a key on the keypad of user interface 42), the setup routine will end. If the user chooses to enter another sequence of digits, the process will repeat, starting at step 100. In this case, the user may enter a sequence of digits of different length than the sequence previously entered, or the user may correct a mistake in the sequence previously entered by simply re-entering a sequence of the same length.

The existence of every step of this process is not critical to the setup routine. For example, the user interface may be simplified by allowing the entry of only one sequence of digits, stored in only one possible memory location, such as a 3 or 7 digit sequence, to be automatically prepended whenever the user enters a 4 digit abbreviated extension. Further, the setup routine may not be necessary at all, as a prefix may be pre-stored in memory 40 before a user even receives his subscriber terminal, which might be the case, for example, if a company with its own PBX issues wireless subscriber terminals to its employees.

Once a sequence of digits has been stored in memory 40, the subscriber terminal 30 is ready to prepend the stored sequence of digits to any abbreviated number the user dials.

Exemplary embodiments of the present invention have been illustrated and described. It will be understood, however, that changes and modifications may be made to the invention without deviating from the spirit and scope of the invention, as defined by the following claims.

We claim:

1. A subscriber terminal comprising, in combination:

a processor;

a memory;

a phone book stored in the memory, the phone book defining a plurality of telephone numbers;

at least one digit sequence stored in the memory; and a translation routine executable by the processor (a) to receive digits entered by a user, (b) to determine whether the digits entered by the user represent an incomplete set of digits, and (c) in response to a determination that the digits entered by the user represent an incomplete set of digits:

(i) to make a determination of whether the digits entered by the user match digits at an end of any telephone number defined by the phone book, (ii) if the determination is that the digits entered by the user match digits at an end of a telephone number defined by the phone book, to initiate a call to the telephone number, and (iii) if the determination is that the digits entered by the user do not match digits at an end of any telephone number defined by the phone book, to automatically add one of the at least one digit sequence stored in the memory to the digits entered by the user so as to establish a composite telephone number, and to initiate a call to the composite telephone number.

2. The subscriber terminal of claim 1, further comprising a setup routine executable by the processor to prompt the user to specify the at least one digit sequence, to receive the at least one digit sequence, and to responsively store the at least one digit sequence in the memory.

3. The subscriber terminal of claim 2, wherein the subscriber terminal is a wireless subscriber terminal.

4. The subscriber terminal of claim 3, further comprising a Send button, wherein the translation routine is executed by the processor after the user enters digits and presses the Send button.

5. A subscriber terminal comprising, in combination:

a processor;

a memory;

a phone book stored in the memory, the phone book defining a plurality of telephone numbers;

at least one digit sequence stored in the memory; and a translation routine executable by the processor to receive digits entered by a user, and to determine whether the digits entered by the user represent an abbreviated number, and, in response to a determination that the digits entered by the user represent an abbreviated number:

(a) to make a determination of whether the digits entered by the user match digits at an end of any telephone number defined by the phone book, (b) if the determination is that the digits entered by the user match digits at an end of a telephone number defined by the phone book, to initiate a call to the telephone number, and (c) if the determination is that the digits entered by the user do not match digits at an end of any telephone number defined by the phone book, to automatically prepend a given one of the at least one digit sequence stored in the memory to the digits entered by the user so as to establish a composite telephone number, and to initiate a call to the composite telephone number.

6. The subscriber terminal of claim 5, wherein the subscriber terminal is a wireless subscriber terminal.

7. The subscriber terminal of claim 5, further comprising an abbreviated dialing setup routine executable by the processor to prompt the user to specify the at least one digit sequence, to receive the at least one digit sequence, and to responsively store the at least one digit sequence in the memory.

8. The subscriber terminal of claim 5, further comprising a Send button, wherein the translation routine is executed by the processor after the user enters digits and presses the Send button.

9. The subscriber terminal of claim 5, wherein the subscriber terminal is a landline subscriber terminal.

10. The subscriber terminal of claim 5, further comprising a selection routine executable by the processor to determine a length of the abbreviated number entered by the user and to use the length as a basis to select the given one of the digit sequences to prepend to the digits entered by the user.

11. A method for providing abbreviated dialing in a subscriber terminal, the subscriber terminal including a processor and a memory, and including a phone book stored in the memory for containing a plurality of telephone numbers, the method comprising:

executing first logic to prompt a user to specify one or more sequences of digits, and to receive one or more sequences of digits, and to responsively store one or more sequences of digits in the memory, each sequence of digits having a respective length; and executing second logic to receive digits entered by a user, to determine whether the digits entered by the user represent an abbreviated number, and, in response to a determination that the digits entered by the user represent an abbreviated number:

(a) to make a determination of whether the digits entered by the user match digits at an end of any telephone number contained in the phone book, (b) if the determination is that the digits entered by the user match digits at an end of a telephone number defined by the phone book, to initiate a call to the telephone number, and (c) if the determination is that the digits entered by the user do not match digits at an end of any telephone number defined by the phone book, to automatically prepend one of the sequences of digits stored in the memory to the digits entered by the user so as to establish a composite telephone number, and to initiate a call to the composite telephone number.

12. The method of claim 11, wherein the subscriber terminal is a wireless subscriber terminal.

13. The method of claim 11, wherein the subscriber terminal is a landline subscriber terminal.

14. The method of claim 11, wherein the subscriber terminal further comprises a Send button, and wherein the second logic is executable by the processor after a user enters digits and presses the Send button.

15. A method for providing abbreviated dialing in a subscriber terminal, the subscriber terminal including a processor and a memory, and including a phone book stored in the memory for containing a plurality of telephone numbers, the method comprising:

prompting a user to specify at least one digit sequence to be stored in the memory;

receiving the at least one digit sequence specified by the user;

storing the at least one digit sequence specified by the user in the memory;

receiving an abbreviated number entered by a user;

making a determination of whether the abbreviated number entered by the user matches digits at an end of any telephone number contained in the phone book;

if the determination is that the abbreviated number entered by the user matches digits at an end of a telephone number contained in the phone book, initiating a call to the telephone number; and if the determination is that the abbreviated number entered by the user does not match digits at an end of any telephone number contained in the phone book, (a) determining a length of the abbreviated number entered by the user, (b) using the length of the abbreviated number as a basis to select one of the at least one digit sequence stored in the memory, (c) automatically prepending the selected digit sequence to the abbreviated number entered by the user so as to establish a composite telephone number, and (d) initiating a call to the composite telephone number.

16. A method for providing abbreviated dialing in a subscriber terminal, the subscriber terminal including a processor, a memory, and a first and a second digit sequence stored in the memory, each digit sequence having a respective length, the subscriber terminal further including a phone book stored in the memory for containing a plurality of telephone numbers, the method comprising:

receiving an abbreviated number entered by a user;

making a determination of whether the abbreviated number entered by the user matches digits at an end of any telephone number contained in the phone book;

if the determination is that the abbreviated number entered by the user matches digits at an end of a telephone number contained in the phone book, initiating a call to the telephone number; and if the determination is that the abbreviated number entered by the user does not match digits at the end of any telephone number contained in the phone book, (a) determining a length of the abbreviated number entered by the user, (b) using the length of the abbreviated number as a basis to select one of the digit sequences stored in the memory, (c) automatically prepending the selected digit sequence to the abbreviated number entered by the user so as to establish a composite set of digits, and (d) initiating a call to the composite telephone number.

17. The method of claim 16, wherein selecting one of the digit sequences stored in memory comprises:

if the length of the abbreviated number is 4 digits, then selecting the first digit sequence; and if the length of the abbreviated number is 5 digits, then selecting the second digit sequence.

18. A subscriber terminal comprising, in combination:

a processor;

a memory;

a phone book stored in the memory, the phone book defining a plurality of telephone numbers;

at least one digit sequence stored in the memory; and a translation routine executable by the processor (a) to receive digits entered by a user, (b) to determine whether the digits entered by the user represent an incomplete set of digits, and (c) in response to a determination that the digits entered by the user represent an incomplete set of digits, to (i) determine whether the digits entered by the user match digits at an end of any telephone number defined by the phone book and (ii) in response to a determination that the digits entered by the user do not match digits at an end of any telephone number defined by the phone book, to automatically add one of the at least one digit sequence stored in the memory to the digits entered by the user so as to establish a complete set of digits, whereby the subscriber terminal may send the complete set of digits into a communications network.

* * * * *